(12) United States Patent
Pitkanen et al.

(10) Patent No.: US 6,342,564 B1
(45) Date of Patent: Jan. 29, 2002

(54) HETEROPHASIC PROPYLENE COPOLYMER AND PROCESS FOR ITS PREPARATION

(75) Inventors: Paivi Pitkanen, Halkia; Bo Malm, Espoo; Kauno Alastalo, Porvoo, all of (FI)

(73) Assignee: Borealis Technology Oy (FI)

( * ) Notice: Subject to any disclaimer, the term of this patent is extended or adjusted under 35 U.S.C. 154(b) by 0 days.

(21) Appl. No.: 09/446,719

(22) PCT Filed: Jun. 24, 1998

(86) PCT No.: PCT/GB98/01843

§ 371 Date: Mar. 27, 2000

§ 102(e) Date: Mar. 27, 2000

(87) PCT Pub. No.: WO98/59002

PCT Pub. Date: Dec. 30, 1998

(30) Foreign Application Priority Data

Jun. 24, 1997 (FI) .................................................. 972714
Jun. 24, 1997 (FI) .................................................. 972726
Jun. 24, 1997 (FI) .................................................. 972727
Jun. 24, 1997 (FI) .................................................. 972729

(51) Int. Cl.$^7$ ............................. C08L 23/00; C08L 23/04
(52) U.S. Cl. ......................................... 525/191; 525/240
(58) Field of Search ................................. 525/191, 240

(56) References Cited

U.S. PATENT DOCUMENTS

| | | |
|---|---|---|
| 4,740,550 A | 4/1988 | Foster |
| 4,740,551 A | 4/1988 | Foster |
| 5,468,810 A | 11/1995 | Hayakawa et al. |
| 5,622,765 A * | 4/1997 | Clementini et al. ........... 428/97 |

FOREIGN PATENT DOCUMENTS

| | | |
|---|---|---|
| DE | 4426569 A1 | 2/1995 |
| EP | 0373660 A2 | 6/1990 |
| EP | 0 400 333 A2 | 12/1990 |
| EP | 0416379 A2 | 3/1991 |
| EP | 0 400 333 A3 | 9/1991 |
| EP | 0 597 461 A2 | 5/1994 |
| EP | 0603723 A1 | 6/1994 |
| EP | 0 628 574 A1 | 12/1994 |
| EP | 0 597 461 A3 | 1/1995 |
| EP | 0714923 A1 | 6/1996 |
| WO | WO88/02376 | 4/1988 |

* cited by examiner

Primary Examiner—Nathan M. Nutter
(74) Attorney, Agent, or Firm—Karen Lee Orzechows; Liniak, Berenato, Longacre & White, L.L.P.

(57) ABSTRACT

A hetrophasic polypropylene copolymer having a tensile modulus of 420 Mpa or less comprising: i) a semi-crystalline propylene:ethylene: and optionally other α-olefin polymer matrix; ii) an elastomeric propylene:ethylene and optionally other α-olefin copolymer.

25 Claims, No Drawings

HETEROPHASIC PROPYLENE COPOLYMER AND PROCESS FOR ITS PREPARATION

BACKGROUND OF THE INVENTION

The present invention relates to heterophasic polypropylene copolymers and in particular to heterophasic polypropylene copolymers which are soft, have good impact resistance at low temperatures, good heat sealing properties and good optical properties.

Traditionally, polymers in which low stiffness, and therefore low tensile modulus, as well as good impact at low temperatures are desired properties, have been prepared from soft poly(vinyl chloride) (PVC). However, because PVC products cause environmental problems due to emissions of chlorinated organic compounds during combustion there is currently a trend towards replacing PVC with other polymers. As an alternative to PVC polymers polypropylene polymers have been employed since such polymers are known to have suitable resistance to heat and chemicals as well as attractive mechanical properties.

It is known that certain heterophasic polypropylene copolymers are particularly suitable as soft polymers. When producing soft heterophasic polypropylene copolymers, it is usual to prepare a polypropylene copolymer matrix with a comonomer content to obtain the desired properties. To achieve lower stiffness an amorphous elastomeric component can then be added to the copolymer matrix.

For example, in EP-A-0373660 (Himont Incorporated) a propylene polymer composition is described which has good transparency and improved low temperature impact resistance comprising 70 to 98% crystalline copolymer of propylene with ethylene and/or other α-olefin and an elastomeric propylene-ethylene copolymer.

In EP-A-0416379 (Himont Incorporated) a thermoplastic olefin polymer having elastic properties is disclosed comprising a crystalline polymer fraction comprising for example a copolymer of propylene with at least one α-olefin, a semi-crystalline fraction and 2 to 30% amorphous copolymer fraction of α-olefin and propylene with or without diene.

In the two applications discussed above, for reasons of economy, the initial copolymer matrix can be produced in a slurry reactor rather than in a gas phase reactor. The product of the slurry phase reaction is then flashed to remove unreacted monomers and transferred into a gas phase reactor where further reaction takes place and the elastomeric component is prepared.

However, since the matrix component is prepared in the liquid phase, the comonomer content of the matrix and thus the tensile modulus is limited. Comonomers such as ethylene and other α-olefins cause swelling of the polymers during the reaction in the slurry reactor. When the reaction medium is flashed to remove the monomer reactants after polymerisation of the matrix but before transfer to the gas phase reactor, the morphology of the particles is destroyed and the bulk density of the powder becomes very low. This sticky material agglomerates on the walls in the flash tank and causes problems in transportation into the gas reactor. These problems increase when the proportion of comonomers in the copolymer increases and therefore the softness of the polymer is limited.

Attempts to reduce the stickiness of the material in the flash tank by catalyst manipulation or by reducing the content of xylene-soluble fraction have had limited success and accordingly, in order to obtain soft polypropylene copolymers with a very high comonomer content gas phase polymerisation has traditionally been required.

BRIEF SUMMARY OF THE INVENTION

It has now been surprisingly found that soft polypropylene copolymers can be prepared economically with low tensile modulus values and high comonomer content since the flashing of the matrix mixture prepared in a liquid phase reactor (e.g. a slurry reactor) is unnecessary and transfer of the neat reaction mixture from the liquid phase to the gas phase reactor can be effected directly. Since the flashing step is omitted, there are no problems with the sticky material sticking on the walls of the flash tank and therefore higher comonomer concentrations can be achieved and softness properties improved.

Thus, viewed from one aspect the invention provides a heterophasic polypropylene copolymer having a tensile modulus of 420 MPa or less comprising:

i) a semi-crystalline propylene:ethylene: and optionally other α-olefin copolymer matrix;

ii) an elastomeric propylene:ethylene and optionally other α-olefin copolymer.

Viewed from another aspect the invention provides a process for the preparation of a heterophasic polypropylene copolymer having a tensile modulus of 420 MPa or less comprising:

i) producing a semi-crystalline propylene:ethylene and optionally other α-olefin copolymer matrix in one or more slurry reactors and optionally one or more gas phase reactors;

ii) followed by producing an elastomeric propylene:ethylene and optionally other α-olefin copolymer in the gas phase;

characterised in that the transfer from liquid phase reactor to a subsequent gas phase reactor is effected without flashing to remove unreacted monomer.

DETAILED DESCRIPTION OF THE INVENTION

For the purposes of this application, the term copolymer encompasses polymers comprising two or more comonomers.

The semi-crystalline polypropylene copolymer matrix preferably comprises 0.5 to 10 wt % ethylene and optionally 5 to 12 wt % of other α-olefin. Where the semi-crystalline polypropylene copolymer matrix comprises an α-olefin in addition to ethylene and propylene, ethylene more preferably comprises 1 to 7 wt %, most preferably, 1 to 5 wt % of the matrix and the additional α-olefin 6 to 10 wt % of the matrix.

Where the semi-crystalline matrix component is an ethylene:propylene copolymer only, the ethylene preferably comprises 3.5 to 8.0 wt %, most preferably 4 to 7 wt % by weight of the matrix.

The other α-olefin is may be a $C_{4-20}$ mono or diene, and may be linear, branched or cyclic. The other α-olefin is preferably of structure $H_2C{=}CHR$ where R represents an alkyl group. Preferably, the α-olefin has between 4 and 8 carbon atoms and is most preferably 1-butene, 1-pentene, 4-methyl-1-pentene, 1-hexene, 1-heptene or 1-octene, especially 1-butene.

The xylene soluble fraction (XS) of the matrix component is preferably in the range 3 to 30%, most preferably 6 to 20% by weight of the matrix component.

The elastomeric propylene:ethylene and optionally other α-olefin copolymer can comprise any suitable ratio of monomers of propylene, ethylene and optionally other α-olefin which results in an amorphous or semicrystalline/amorphous elastomeric copolymer. Preferably, the elastomeric component comprises a copolymer of ethylene and propylene only.

The amount of matrix component in the heterophasic copolymers of the invention is between 20 to 90%, preferably 60 to 90% by weight of the heterophasic copolymer. The amount of elastomeric copolymer may be in the range of 10 to 80%, preferably 10 to 40% by weight of the heterophasic polymer. The elastomer component may comprise 95–5 wt %, preferably 95–20 wt % of crystalline phase and 5–95 wt %, preferably 5–80 wt % amorphous phase.

In one embodiment, 5 to 40% wt of elastomer or plastomer, based on the weight of the heterophasic copolymer may be blended into the heterophasic polymers of the invention. By adding varying amounts of elastomer or plastomer to the heterophasic polymers of the invention, the stiffness of the polymers can be further reduced, optical properties improved and low temperature impact resistance enhanced. Suitable elastomers include ethylene:butene rubber, terpolymer rubber but is preferably ethylene:propylene rubber (EPR). Elastomer may also be added in the form of ethylene:propylene diene monomer (EPDM). These elastomers can be prepared by conventional processes and blended into the heterophasic polymers of the invention by standard mixing techniques.

The tensile modulus of the heterophasic polymer of the invention is 420 MPa or less but preferably should be greater than 80 MPa, preferably greater than 100 MPa. More preferably, the tensile modulus should be in the range 100 to 400 MPa, even more preferably 100 to 350 MPa and most preferably 100 to 300 MPa.

The xylene soluble fraction (XS) of the final heterophasic polymer is preferably between 20 to 60%, most preferably 30 to 45%.

To ensure that the heterophasic polymers have suitable impact properties it is preferred that the polymers be classified as ductile at −20° C.

The heterophasic polypropylene copolymers of the invention are produced in a combination of at least one slurry and at least one gas phase reactor connected directly together, thus avoiding the flash step and thus the disadvantages discussed above when producing high comonomer content products using a flash step.

Suitable preparation methods will be readily determined by the person skilled in the art and include but are not limited to:

A. producing the polypropylene copolymer matrix containing ethylene, and optionally other higher α-olefin in one or two slurry reactors, then feeding the slurry reactor mixture directly into a gas phase reactor, and producing in the gas phase reactor (GPR) an elastomeric copolymer.

B. producing the polypropylene copolymer matrix containing ethylene, and/or other higher α-olefin in two steps firstly in one or more slurry reactors and then in a gas phase reactor using a direct feed from slurry reactor into the GPR, and then feeding the reaction mixture into a second GPR and continuing the polymerisation to produce a similar elastomer as in case A.;

C. producing a heterophasic polymer as described in A or B and then producing more elastomeric copolymer in further gas phase reactors.

D. producing a a heterophasic polymer as described in A, B or C, and then blending in a suitable amount of elastomer (e.g. EPR, EPDM) or plastomer prepared by conventional techniques.

The comonomer feeds into the various reactors may be adapted to produce a polymer with the desired properties and the amounts of comonomer will be readily determined by the person skilled in the art.

In the slurry reactor, propylene preferably acts not only as a monomer for polymerisation but also as a diluent. The slurry step, which preferably occurs in a loop reactor, is carried out by feeding into at least one slurry polymerization step a reaction mixture containing 50–95 wt % of propylene, 1–10 wt % of ethylene and 0–40 wt % of other α-olefin, and a catalyst system whilst maintaining olefin polymerization at a temperature below 75° C. Where two or more slurry reactors are used, these are preferably loop reactors and are fed by the same comonomer mixture as for a single slurry reactor. From the slurry reactor the reaction mixture is fed directly to one or more gas phase reactors.

Where one gas phase reactor is employed, the gas phase polymerization step is preferably carried out by adding 0–40 wt % for propylene, 1–30 wt % for ethylene, 0–10 wt % for other α-olefin of the feed mixture. Preferably, the gas ratio employed in the feed mixture in the preparation of the elastomeric component is C2/(total monomer) (mol/mol) is between 0.05–0.5, preferably 0.2–0.5 and C4/(total monomer) is greater or equal to 0.15. In this case the gas phase reactor is primarily employed to produce the elastomeric copolymer component which preferably comprises 5 to 40 wt %, most preferably 10 to 40 wt % of the heterophasic polymer of the invention.

Where a further gas phase reactor is employed, the first gas phase reactor is primarily employed to produce further matrix component. In this case the ethylene feed into the first gas phase reactor is preferably 15 wt %, most preferably 1 to 8 wt %. The gas phase polymerization step is preferably continued in the second gas phase reactor by adjusting the gas concentrations to 60–90 wt % for propylene, 5–40 wt % for ethylene and 0–10 wt % of other α-olefins. Such concentrations produce more elastomeric semicrystalline and amorphous copolymer into the product produced in the first gas phase polymerization step.

In one embodiment, hydrogen may be added into either or both of the slurry phase or gas phase to control the molecular weight of the polymer of the invention. The use of hydrogen in olefin polymerisation is conventional and will be readily applied by the person skilled in the art.

The slurry phase polymerisation may be carried out at temperatures of lower than 75° C., preferably 60–65° C. and pressures varying between 30–90 bar, preferably 30–70 bar. The polymerization is preferably carried out in such conditions that 20–90 wt %, preferably 40–80 wt % from the polymer is polymerized in the slurry reactor or reactors. The residence time can be between 15 and 120 min.

The gas phase polymerization step is carried out by transferring the reaction mixture from the slurry phase directly to the gas phase without removing unreacted monomers, preferably higher than 10 bars. The reaction temperature used will generally be in the range 60 to 115° C., preferably 70 to 110° C. The reactor pressure will be higher than 5 bars, and preferably be in the range 10 to 25 bar, and the residence time will generally be 0.1 to 5 hours. Since unreacted monomers from the slurry phase are transferred into the gas phase it is important to establish how much unreacted monomer has been transferred to allow ready determination of how much further monomer to add to the gas phase. Such measurements can be achieved by simple gas chromatography allowing maintainence of appropriate comonomer concentrations.

The liquid medium from the first stage reactor can function as a cooling medium of the fluid bed in the gas phase reactor, when evaporating therein.

Preferably, a loop reactor is used as said slurry reactor although other reactor types such as a tank reactor could also be employed. According to another embodiment said slurry phase is carried out in two slurry reactors, preferably but not necessarily in two loop reactors. In this way the comonomer distribution can be easily controlled. When continuing the copolymerization in a gas phase reactor or reactors, comonomer content can be increased further. Thus, the matrix polymer can be tailored by adjusting comonomer ratios in different reactors.

Elastomer may be produced into the heterophasic polymer of the invention in one or more gas phase reactors or blended into the final polymer using standard blending procedures. By controlling the amount and composition of elastomer component in the final polymer, the properties, e.g. optical and impact properties and softness, can be adjusted.

Polymerisation may be achieved using any standard olefin polymerisation catalyst and these are well known to the person skilled in the art. Preferred catalyst systems comprise an ordinary stereospecific Ziegler-Natta catalyst, metallocene catalysts and other organometallic or coordination catalysts. A particularly preferred catalyst system is a high yield Ziegler-Natta catalyst having a catalyst component, a cocatalyst component, optionally an external donor. The catalyst system may thus contain a titanium compound and an electron-donor compound supported on an activated magnesium dichloride, a trialkylaluminium compound as activator and an electron donor compound.

A further preferred catalyst system is a metallocene catalyst having a bridged structure giving high stereoselectivity and which as an active complex is impregnated on a carrier.

Suitable catalyst systems are described in for example, FI Patent No. 88047, EP 491566, EP 586390 and WO98/12234 which are hereby incorporated by reference.

Soft propylene copolymer products having low stiffness, high low temperature impact and optionally owing good sealability and transparency can be used in a wide variety of applications such as films, moulded items, sheets, lids, bottles, fibres, tubes, foams, cable jacketing and insulation, and compounds (flame retardant and other high filled compounds).

EXAMPLES

A combination of a slurry and gas phase reactors were used for producing soft heterophasic polypropylene copolymers of the invention.

The following analytical techniques were used in testing the polymers synthesised:

Melt flow rates (MFR) were measured under a load of 2.16 kg and at 230° C. according to ISO 1133.
Comonomer contents (ethylene and butene) were measured with Fourier transform infrared specroscopy (FTIR) calibrated by nuclear magnetic resonance spectroscopy (NMR).
Melting temperatures (peak temperatures) were measured with differential scanning calorimetry (DSC) using a temperature increasing rate of 10° C./min.
Tensile strength (tensile stress at yield) was measured according to ISO 572-2 (cross head speed=50 mm/min).
Tensile modulus was measured according to ISO 572-2 (cross head speed=1 mm/min).
Flexural modulus was measured according to ISO 178.
Izod, notched impact strength was measured according to ISO 180/1A.
Instrumentated falling weight impact was measured according to ISO 6603-2.
Film tests were measured from 40 micrometer thin film produced at a cast film line (Collin), melt temperature 270° C. and chill roll temperature 30° C.
Film modulus (1% secant modulus) was measured according to ISO 1184 (ASTM D882) (cross head speed=5 mm/min).
Haze was measured according to ASTM D 1003 and gloss at 60° C. according to ASTM D 523.
Heat sealing properties were measured from 25 micrometer ABA-film (core layer PP homopolymer and as the surface layer the examined heat seal PP terpolymer. Sealing time was 0.1 s and pressure 3 bar. Heat seal strength=pealing of the seal using film strips, broadness 25.41 mm was measured at an Instron universal tester (cross head speed= 100 mm/min).

Examples 1–5

Polymerisations were carried out in a stirred 5 dm³ bench scale reactor. A matrix was produced in liquid propylene at 60° C. in the first stage. After the desired 1 h polymerisation time the pressure was reduced slowly to 7 bar and polymerisation was continued in gas phase. In gas phase, semicrystalline and amorphous copolymers were polymerised at 75° C. into the matrix 1 to 1.5 h.

The catalyst used was prepared according to WO98/12234, the activity of which was 35 kg PP/g cat h.

The polymerization conditions and the polymer properties are presented in Table 1.

In the Example 5, the pressure was reduced rapidly to atmospheric pressure, simulating flash tank operation. Polymerisation in the gas phase was not possible and only the matrix component was produced.

TABLE 1

|  | EX 1 | EX 2 | EX 3 | EX 4 | EX 5 |
|---|---|---|---|---|---|
| Slurry Stage | | | | | |
| $C_2$ feed, w % | 3.2 | 3.2 | 2.4 | 1.5 | 2.6 |
| $C_4$ feed, w % | — | — | 20 | 25 | 20 |
| Gas Phase Stage | | | | | |
| $C_2$/total monomer in reactor | 0.33 | 0.34 | 0.31 | 0.36 | — |
| $C_4$ feed | — | — | C4 from 1. stage | C4 from 1. stage | — |
| Matrix | | | | | |
| $C_2$, w % | 4.8 | 4.8 | 4.0 | 2.8 | 2.8 |
| $C_4$, w % | — | — | 6.4 | 8.3 | 6.8 |
| Xylene Soluble Fraction (XS), % | 10.0 | 10.02 | 20.6 | 19.7 | 15.8 |
| Final Product | | | | | |
| Amt of matrix, % | 75 | 70 | 73 | 79 | 100 |
| MFR, g/10 min | 4.2 | 3.3 | 2.6 | 5.3 | 4.5 |
| $C_2$, w % | 14.1 | 15.9 | 12.1 | 11.8 | |
| $C_4$, w % | — | — | 7.3 | 9.4 | |
| XS, % | 32.1 | 35.7 | 40.2 | 42 | |
| IV/XS, dl/g | 2.0 | 2.0 | 1.7 | 1.8 | |
| $C_2$/XS, % | 30.4 | 27.6 | 20.3 | n.a. | |
| $C_4$/XS, % | — | — | 12.5 | n.a. | |
| Tensile modulus, MPa | 340 | 260 | 260 | 200 | |
| falling weight impact at −20° C. | ductile | ductile | ductile | ductile | | n.a. = not analysed.

Example 6 (Comparitive)

A combination of a pilot-scale loop reactor and a gas phase reactor were used to produce soft heterophasic polypropylene copolymers. Propylene, ethylene and hydrogen were fed into the loop reactor. The polymerization temperature in the loop reactor was 70° C. The temperature in the GPR was 70° C. The pressure in the loop reactor was 40 bar and in the gas phase reactor 10 bar. The catalyst used was as for Examples 1 to 5 giving an activity of 35 kg PP/g cat h.

The random copolymer produced in the loop reactor gave a ethylene content of 3.5–3.7 wt % and a xylene soluble fraction (XS)=9 wt %.

When this copolymer was flashed severe problems arised by sticking in the flash tank, which made the transport to the GPR impossible.

Example 7

A combination of a pilot scale loop reactor and a gas phase reactor was used to produce soft heterophasic copolymer. Random ethylene:propylene copolymer was produced in the loop reactor. The ethylene content of the polymer was 4.2 wt % and the XS was 9 wt %. This reactor mixture was transported directly into the gas phase reactor. More ethylene and propylene were fed using gas ratio C2/(total monomer) of 0.35 mol/mol into the GPR and impact copolymer was produced.

The final heterophasic polymer had ethylene content of 9.5% and XS-fraction of 25%.

To further improve the softness and impact properties 15% of very low density PE copolymer (VLDPE) (Exact 2M011 from DEX plastomers, density 0.88) was blended giving the following properties:

TABLE

|  |  | +VLDPE (15%) |
|---|---|---|
| Tensile modulus, MPa | 590 | 420 |
| Falling weight impact at −20 C, failure type | ductile | ductile |
| falling weight impact at −40 C, failure type | brittle/ductile-brittle | ductile |
| Film modulus, MPa | 280 | 210 |

Example 8

A high ethylene content propylene random copolymer was produced in pilot reactors; a lower ethylene content random copolymer was produced in the loop. The reaction mixture was transported into the gas phase reactor and more ethylene was fed in.

To further improve the softness and impact properties 20% of very low density PE copolymer (VLDPE) (Eact 2M011 from DEX plastomers, density 0.88) was blended giving the following properties:

| Property |  | +VLDPE (20%) |
|---|---|---|
| C2 in first stage, wt % | 3.8 | |
| XS of first stage, wt % | 6.7 | |
| total ethylene content, wt % | 7.9 | 26.5 |
| Tensile modulus, MPa | 380 | 280 |
| falling weight impact, at 0 C, failure type | ductile | ductile |
| falling weight impact, at −20 C, failure type | brittle | ductile |
| film modulus, MPa | 2.20 | 190 |
| haze of film, % | 0.5 | 2.2 |
| gloss of film | 150 | 140 |

Example 9

A heterophasic polypropylene was produced in the pilot scale reactors; a random copolymer was produced in the loop, this reactor mixture was transported directly into the gas phase reactor where more ethylene and propylene were fed using a gas ratio, C2/total monomer of 0.35.

| First stage: | |
|---|---|
| C2, wt % | 4.2 |
| XS, wt % | 7.4 |
| Final product: | |
| C2, wt % | 19.3 |
| XS, wt % | 40 |
| Tensile modulus, MPa | 360 |
| Falling weight impact, at −20, failure type | ductile |
| Falling weight impact, at −40, failure type | ductile |
| Izod impact, at −30, kJ/m2 | 22 |
| Film modulus, Mpa | 190 |
| Haze, 40 um film | 7.6 |

Example 10

A continuously operated pilot plant was used to produce PP-copolymer with good impact and creep properties. The plant comprises catalyst, alkyl, donor, propylene and ethylene feed systems, a prepolymerisation reactor, a loop reactor and two fluidized bed gas phase reactors (GPR).

The catalyst, alkyl, donor and propylene are fed to the prepolymerisation reactor. The polymer slurry from the prepolymerisation reactor is fed to a loop reactor to which also hydrogen, ethylene and additional propylene are fed.

The polymer slurry fiom the loop reactor and additional hydrogen and propylene are fed to the first GPR. The polymer from the first GPR is fed to the second GPR. Ethylene, some hydrogen and additional propylene was fed to the second GPR. The polymer formed and unreacted propylene are separated after removal from the second GPR.

The catalyst used is a highly active and stereospecific ZN-catalyst made according to U.S. Pat. No. 5,234,879. The catalyst is contacted with triethylaluminium (TEA) and dicyclopentyldimethoxysilane (DCPDMS) (Al/Ti ratio is 150 and Al/Do 10 (mole)) before feeding to the prepolymerisation reactor.

The catalyst is fed according to U.S. Pat. No. 5,385,992 and is flushed with propylene to the loop reactor. The prepolymerirnfion reactor is operated at a pressure of 51 bar, a temperature of 20° C. and a mean residence time of the catalyst of 7 min.

The loop reactor is operated at a 50 bar pressure, a 75° C. temperature and a mean residence time of the catalyst of 1 h. The MFR (2.16 kg, 230° C.) of the PP-random polymer produced in the loop is adjusted to 7 by controlling the hydrogen feed. The ethylene content is adjusted to 3.5% w/w by using the ethylene feed as a control means.

The polymer slurry from the loop reactor is transferred to the first GPR. The first GPR reactor is operated at a total pressure of 29 bar and a partial propylene pressure of 21 bar. The operational temperature is 80° C. and the mean residence time of the catalyst 1.5 h. The MFR (2.16 kg, 230° C.) of the PP-randompolymer taken out of the GPR is adjusted to 10 by using the partial hydrogen pressure. The ethylene content is set at 2% w/w by adjusting the production split between the reactors.

The polymer from the first GPR is transferred to the second GPR. The second GPR is operated at a total pressure of 10 bar and a partial monomer pressure of 7 bar. The operational temperature is 80° C. and mean residence time of the catalyst 1.5 h. The MFR (2.16 kg, 230° C.) of the PP-copolymer taken out of the GPR is adjusted to 7 via the partial pressure of the hydrogen. The ethylene content is set at 10% w/w by adjusting the partial pressure of ethylene and by controlling the production split between the reactors.

The desired properties are achieved with a production split of 1% in prepolymerization, 40% in loop, 40% in the first GPR and 19% inthe second GPR.

Example 11

A continuously operated pilot plant was used to produce very soft PP-copolymer. The plant comprises catalyst, alkyl, donor, propylene and ethylene feed systems, prepolymerisation reactor, loop reactor and a fluidized bed gas phase reactor (GPR).

The catalyst, alkyl, donor and propylene were fed to the prepolymerisation reactor. The polymer slurry from the prepolymerisation reactor was fed to a loop reactor to which also hydrogen, ethylene and additional propylene was fed.

The polymer slurry from the loop reactor and additional ethylene, hydrogen and propylene were fed to the GPR. The formed polymer and unreacted monomers were separated after removal from GPR.

The catalyst used was a highly active and stereospecific ZN-catalyst made according to U.S. Pat. No. 5,234,879. The catalyst was contacted with triethylaluminium (TEA) and dicyclopentyldimethoxysilane (DCPDMS) (Al/Ti ratio was 150 and Al/Do 10 (mole)) before feeding to the prepolymerisation reactor.

The catalyst was fed according to U.S. Pat. No. 5,385,992 and was flushed with propylene to the loop reactor. The prepolymerisation reactor was operated at a 51 bar pressure, a 20° C. temperature and a mean residence time of the catalyst of 7 min.

The loop reactor was operated at a pressure of 50 bar, a temperature of 75° C. temperature and mean residence time of the catalyst at 1 h. The MFR (2.16 kg, 230° C.) of the PP-randompolymer produced in the loop was controlled to be 4 via hydrogen feed. The ethylene content was adjusted to 3.8% w/w by controlling the ethylene feed.

The polymer slurry from the loop reactor was transferred to the first GPR. The first GPR reactor was operated at a total pressure of 29 bar and a partial propylene pressure of 21 bar. The operational temperature was 80° C. and the mean residence time of the catalyst 1.2 h. The MFR (2.16 kg, 230° C.) of the PP-randompolymer taken out of the GPR was set at 2.5 by adjusting the partial hydrogen pressure. The ethylene content was set at 8% w/w by adjusting production split between the reactors and the partial pressure of ethylene.

Desired properties are achieved with a production split of 1% in prepolymerisation, 45% in loop and 55% in the GPR.

Example 12

A pilot plant operated continuously is used to produce PP-copolymer with good impact and creep properties. The plant comprises a catalyst alkyl, donor, propylene and ethylene feed systems, a prepolymerization reactor, a loop reactor and two fluidized bed gas phase reactors (GPR).

The catalyst, alkyl, donor and propylene are fed to the prepolymerization reactor. The polymer slurry from the prepolymerization reactor is fed to a loop reactor in which also hydrogen, ethylene and additional propylene are fed.

The polymer slurry from the loop reactor and additional hydrogen and propylene are fed to the 1st GPR. The polymer from 1st GPR is fed to 2nd GPR. Ethylene, some hydrogen and additional propylene was fed to the second GPR. The formed polymer and unreacted propylene are separated after removal from 2nd GPR.

The catalyst used is a highly active and stereospecific ZN-catalyst made according to U.S. Pat. No. 5,234,879. The catalyst is contacted with triethylaluminium (TEA) and dicyclopentyldimethoxysilane (DCPDMS) (Al/Ti ratio is 150 and Al/Do 10 (mole)) before feeding to the prepolymerization reactor.

The catalyst is fed according to U.S. Pat. No. 5,385,992 and is flushed with propylene to the loop reactor. The prepolymerization reactor is operated at a pressure of 51 bar, a temperature of 20° C. and a mean residence time of the catalyst of 7 min.

The loop reactor is operated at 50 bar pressure, 75° C. temperature and mean residence time of the catalyst at 1 h. The MFR (2.16 kg, 230° C.) of the PP-randompolymer produced in the loop is controlled to be 7 via hydrogen feed. The ethylene content is controlled to be 3.5% w/w via ethylene feed.

The polymer slurry from the loop reactor is transferred to the 1st GPR. The 1st GPR reactor is operated at 29 bar total pressure and 21 bar partial pressure of propylene, 80° C. temperature and mean residence time of the catalyst at 1.5 h. The MFR (2.16 kg, 230° C.) of the PP-randompolymer taken out of the GPR is controlled to be 10 via partial pressure of hydrogen. The ethylene content is controlled to be 2% w/w via production split between the reactors.

The polymer from the 1st GPR is transferred to the 2nd GPR. The 2nd GPR reactor is operated at 10 bar total pressure and 7 bar partial pressure of monomers, 80° C. temperature and mean residence time of the catalyst of 1.5 h. The MFR (2.16 kg, 230° C.) of the PP-copolymer taken out of the GPR is controlled to be 7 via partial pressure of hydrogen. The ethylene content is controlled to be 10% w/w via partial pressure of ethylene and controlling the production split between the reactors.

Desired properties are achieved with production split 1% in prepolymerisation, 40% in loop and 40% in the first GPR and 19% in the second GPR.

Example 13

A pilot plant operated continuously is used to produce PP-copolymer with good impact and creep properties. The plant comprises a catalyst, alkyl, donor, propylene and ethylene feed systems, a prepolymerisation reactor, a loop reactor and 2 fluidized bed gas phase reactors (GPR).

Catalyst, alkyl, donor and propylene are fed to the prepolymerisation reactor. The polymer slurry from the prepolymerisation reactor is fed to a loop reactor into which also hydrogen, ethylene and additional propylene are fed.

The polymer slurry from the loop reactor and additional hydrogen and propylene are fed to the 1st GPR. The polymer from the 1st GPR is fed to 2nd GPR. Ethylene, some hydrogen and additional propylene was fed to the second GPR. The formed polymer and unreacted propylene are separated after removal from the 2nd GPR.

The catalyst used is a highly active and stereospecific ZN-catalyst made according to U.S. Pat. No. 5,234,879. The catalyst is contacted with triethylaluminium (TEA) and dicyclopentyldimethoxysilane (DCPDMS) (Al/Ti ratio is 150 and Al/Do 10 (mole)) before feeding to the prepolymerisation reactor.

The catalyst is fed according to U.S. Pat. No. 5,385,992 and is flushed with propylene to the loop reactor. The prepolymerrrafion reactor is operated at a pressure of 51 bar and a temperature of 20° C. and a mean residence time of the catalyst amounting to 7 min.

The loop reactor is operated at a 50 bar pressure, 75° C. temperature and mean residence time of the catalyst at 1 h. The MFR (2.16 kg, 230° C.) of the PPrandompolymer produced in the loop is controlled to be 7 via hydrogen feed. The ethylene content is controlled to be 3.5% w/w via ethylene feed.

The polymer slurry from the loop reactor is transferred to the 1st GPR. The 1st GPR reactor is operated at 29 bar total pressure and 21 bar partial pressure of propylene, 80° C. temperature and mean residence time of the catalyst at 1.5 h. The MFR (2.16 kg, 230° C.) of the PP-randompolymer taken out of the GPR is controlled to be 10 via partial pressure of hydrogen. The ethylene content is controlled to be 2% w/w via production split between the reactors.

The polymer from the 1st GPR is transferred to the 2nd GPR. The 2nd GPR reactor is operated at a total pressure of 10 bar and a partial monomer pressure of 7 bar, a temperature of 80° C. and a mean residence time of the catalyst of 1.5 h. The MFR (2.16 kg, 230° C.) of the PP-copolymer taken out of the GPR is adjusted to 7 using partial pressure of hydrogen. The ethylene content is adjusted to 10% w/w via partial pressure of ethylene and controlling the production split between the reactors.

The desired properties are achieved with a production split comprising 1% in prepolymerrzation, 40% in loop and 40% in the first GPR and 19% in the second GPR.

Example 14

A pilot plant operated continuously was used to produce very soft PP-copolymer. The plant comprises a catalyst, alkyl, donor, propylene and ethylene feed systems, prepolymerisation reactor, loop reactor and a fluidized bed gas phase reactor (GPR). Catalyst, alkyl, donor and propylene was fed to the prepolymerisation reactor. The polymer slurry from the prepolymerisation reactor was fed to a loop reactor in which also hydrogen, ethylene and additional propylene was fed.

The polymer slurry from the loop reactor and additional ethylene, hydrogen and propylene were fed to the GPR. The formed polymer and unreacted monomers were separated after removal from GPR.

The catalyst used was a highly active and stereospecific ZN-catalyst made according to U.S. Pat. No. 5,234,879. The catalyst was contacted with triethylalunnnium (TEA) and dicyclopentyldimethoxysilane (DCPDMS) (Al/Ti ratio was 150 and Al/Do 10 (mole)) before feeding to the prepolymerisation reactor.

The catalyst was fed according to U.S. Pat. No. 5,385,992 and was flushed with propylene to the loop reactor. The prepolymerisation reactor was operated at 51 bar pressure, 20° C. temperature and mean residence time of the catalyst at 7 min.

The loop reactor was operated at 50 bar pressure, 75° C. temperature and mean residence time of the catalyst at 1 h. The MFR (2.16 kg, 230° C.) of the PPrandompolymer produced in the loop was controlled to be 4 via hydrogen feed. The ethylene content was controlled to be 3.8% w/w via ethylene feed.

The polymer slurry from the loop reactor was transferred to the 1st GPR. The 1st GPR reactor was operated at 29 bar total pressure and 21 bar partial pressure of propylene, 80° C. temperature and mean residence time of the catalyst at 1.2 h. The MFR (2.16 kg, 230° C.) of the PPrandompolymer taken out of the GPR was controlled to be 2.5 via partial pressure of hydrogen. The ethylene content was controlled to be 8% w/w via production split between the reactors and partial pressure of ethylene.

Desired properties are achieved with a production split of 1% in prepolymerisation, 45% in loop and 55% in the GPR.

The polymer from the GPR could have been transferred to another GPR to produce even softer PP copolymer by having even higher partial pressure of ethylene in the 2nd GPR.

Examples 15–18

A combination of a pilot-scale loop reactor and a gas phase reactor were used to produce propylene copolymers for films. Propylene, ethylene, butene and hydrogen were fed into the loop reactor. The polymerisation temperature was 60° C. in both reactors. The pressure in the loop reactor was 35 bar and in the gas phase reactor 15 bar. The catalyst used was a prepolymerised catalyst prepared according to F170028 and FI 86472, the activity of which was 35 kg PP/g cat h.

The polymer produced along with unreacted monomers was flashed straight into the gas phase reactor and polymerisation was completed therein. The polymerisation conditions are presented in the following table.

|  | Ex 15 | | Ex 16 | | Ex 17 | | Ex 18 | |
| --- | --- | --- | --- | --- | --- | --- | --- | --- |
|  | loop | gas | loop | gas | loop | gas | loop | gas |
| Pressure bar | 35 | 15 | 35 | 15 | 35 | 15 | 35 | 35 |
| Temperature ° C. | 60 | 60 | 60 | 60 | 60 | 60 | 60 | 60 |
| Production rate | 8.0 | 1.0 | 8.0 | 5 | 8.0 | 5 | 6.7 | 5.0 |
| Propyle feed kg/h | 24 | — | 24 | — | 23 | — | 22 | — |
| Ethylene feed kg/h | 0.27 | 0.15 | 0.27 | 0.2 | 0.25 | 0.2 | 0.21 | 0.17 |
| Butene feed kg/h | 5.6 | — | 5.6 | — | 7.3 | — | 8.0 | — |
| Residence time min | 150 | 10 | 150 | 120 | 150 | 120 | 150 | 150 |
| Bulk density g/dm$^3$ |  | 0.42 |  | 0.39 |  | 0.4 |  | 0.4 |

The product properties of the copolymer obtained from the gas phase reactor are presented the following Table.

|  | Ex 15 | Ex 16 | Ex 17 | Ex 18 |
| --- | --- | --- | --- | --- |
| MFR (g/10 min) | 6.2 | 5.5 | 4.9 | 5.6 |
| Total ethylene content (w-%) | 2.7 | 4.3 | 3.2 | 2.9 |
| Total butene content (w-%) | 5.9 | 8.0 | 10.3 | 11.7 |

-continued

|  | Ex 15 | Ex 16 | Ex 17 | Ex 18 |
|---|---|---|---|---|
| Melting temperature (° C.) | 131 | 128 | 125 | 124 |
| Izod notched at RT (kI/m$^2$) | 9.7 | 34.5 | 27 | 12.5 |
| Tensile strength (MPa) | 21.0 | 15.5 | 15.9 | 16.0 |
| Film tests (thickness 40 μm) |  |  |  |  |
| 1% secant modulus (MPa) | 310 | 200 | 220 | 250 |
| Haze (%) | 1.1 | 1.3 | 1.1 | 1.1 |
| Gloss, 60° | 148 | 145 | 149 | 147 |
| Heat seal strength: Temp./seal strength |  | 120° C./ 4.9 N |  | 110° C./ 4.7 N |

Example 19

Polymerisation was carried out as in Examples 15 to 18 by using a wax-prepolymerized catalyst made according to Finnish patent 88047. The polymerisation conditions are presented in the following Table.

|  | Ex 19 | |
|---|---|---|
|  | loop | gas |
| Temperature (° C.) | 60 | 74 |
| Pressure (bar) | 38 | 15 |
| Production rate (kg/h) | 11.0 | 8 |
| Propylene feed (kg/h) | 23 | — |
| Ethylene feed (kg/h) | 0.25 | — |
| Butene feed (kg/h) | 7.3 | — |
| Residence time min | 114 | 120 |
| Bulk density (kg/dm$^3$) |  | 0.35 |

The copolymer obtained had the properties shown in the following Table.

|  | Ex 19 |
|---|---|
| MFR$_2$ (g/10 min) | 4.9 |
| Ethylene content (w-%, w-w) | 3.5 |
| Butene content (w-w-%) | 12.4 |
| Melt temperature (° C.) | 120 |
| Tensile strength (MPa) | 14.2 |
| Tensile modulus (MPa) | 360 |
| Izod notched kl/m$^2$ | 54 |
| 1% secant modulus | 190 |
| Haze (%) | 1.3 |
| Gloss, 60 | 152 |
| Heat seal strength temp./seal strength |  |

What is claimed is:

1. A heterophasic polypropylene copolymer having a tensile modulus of 420 MPa or less, said heterophasic polypropylene copolymer consisting essentially of:
   i) a semi-crystalline propylene:ethylene: and optionally other α-olefin polymer matrix; and
   ii) an elastomeric propylene:ethylene and optionally other α-olefin copolymer.

2. A polymer as claimed in claim 1 wherein said matrix comprises 0.5 to 10 wt % ethylene and 5 to 12% wt additional α-olefin.

3. A polymer as claimed in claim 2 wherein said matrix comprises 1 to 7 wt % ethylene and 6 to 10% wt additional α-olefin.

4. A polymer as claimed in claim 1 wherein said matrix comprises a further α-olefin having 4 to 8 carbon atoms.

5. A polymer as claimed in claim 4 wherein said matrix comprises 1-butene, 1-pentene, 4-methyl-1-pentene, 1-hexene, 1-heptene or 1-octene.

6. A polymer as claimed in claim 5 wherein said matrix comprises 1-butene.

7. A polymer as claimed in claim 1 wherein said matrix component is an ethylene:propylene copolymer only.

8. A polymer as claimed in claim 7 wherein said matrix component comprises 3.5 to 8 wt % ethylene.

9. A polymer as claimed in claim 8 wherein said matrix component comprises 4 to 7 wt % ethylene.

10. A polymer as claimed in claim 1 wherein the xylene soluble fraction (XS) of the matrix component is in the range 3 to 30 wt %.

11. A polymer as claimed in claim 10 wherein the xylene soluble fraction (XS) of the matrix component is in the range 6 to 20 wt %.

12. A polymer as claimed in claim 1 wherein said matrix component forms 20 to 90 wt % of the heterophasic polymer.

13. A polymer as claimed in claim 12 wherein said matrix component forms 60 to 90 wt % of the heterophasic polymer.

14. A polymer as claimed in claim 1 wherein said elastomeric component comprises a further alpha olefin.

15. A polymer as claimed in claim 1 wherein said elastomeric component is a propylene:ethylene copolymer only.

16. A polymer as claimed in claim 1 wherein said elastomeric component forms 10 to 80 wt % of the heterophasic polymer.

17. A polymer as claimed in claim 16 wherein said elastomeric component forms 10 to 40 wt % of the heterophasic polymer.

18. A polymer as claimed in claim 1 wherein the tensile modulus of the polymer is in the range 100 to 400 MPa.

19. A polymer as claimed in claim 18 wherein the tensile modulus of the polymer is in the range 100 to 300 MPa.

20. A polymer as claimed in claim 1 wherein the xylene soluble fraction (XS) of the heterophasic polymer is between 20 to 60%.

21. A polymer as claimed in claim 20 wherein the xylene soluble fraction (XS) of the heterophasic polymer is between 30 to 45%.

22. A polymer as claimed in claim 1 wherein 5 to 40 wt % of further elastomer, based on the weight of the heterophasic copolymer, is blended into the polymer.

23. A polymer as claimed in claim 22 wherein said further elastomer is ethylene:propylene rubber or plastomer.

24. A process for the preparation of a heterophasic polypropylene copolymer having a tensile modulus of 420 MPa or less comprising a semi-crystalline propylene:ethylene: and optionally other α-olefin polymer matrix and an elastomeric propylene:ethylene and optionally other α-olefin copolymer, said process comprising the steps of:
   i) producing a semi-crystalline propylene:ethylene and optionally other α-olefin copolymer matrix in one or more slurry reactors and optionally one or more gas phase reactors;
   ii) followed by producing an elastomeric propylene:ethylene and optionally other α-olefin copolymer in the gas phase;
   characterised in that the transfer from liquid phase reactor to a subsequent gas phase reactor is effected without flashing to remove unreacted monomer.

25. Films, moulded items, sheets, lids, bottles, fibres, tubes, foams, cable jacketing, insulation, and filled compounds containing a polymer as claimed in claim 1.

* * * * *